United States Patent
Burkett et al.

(10) Patent No.: US 10,007,080 B2
(45) Date of Patent: Jun. 26, 2018

(54) FLEX PORT ENABLED TELECOMMUNICATIONS CLOSURE

(71) Applicant: Corning Optical Communications LLC, Hickory, NC (US)

(72) Inventors: Alan Duncan Burkett, Bedford, TX (US); Monique Lise Cote, Fort Worth, TX (US); David Kimondo Waruiru, Fort Worth, TX (US)

(73) Assignee: Corning Research & Development Corporation, Corning, NY (US)

( * ) Notice: Subject to any disclaimer, the term of this patent is extended or adjusted under 35 U.S.C. 154(b) by 0 days. days.

(21) Appl. No.: 15/337,086

(22) Filed: Oct. 28, 2016

(65) Prior Publication Data

US 2018/0059348 A1  Mar. 1, 2018

Related U.S. Application Data (60) Provisional application No. 62/381,968, filed on Aug. 31, 2016, provisional application No. 62/398,773, filed on Sep. 23, 2016.

(51) Int. Cl.
*G02B 6/00* (2006.01)
*G02B 6/44* (2006.01)

(52) U.S. Cl.
CPC ........... *G02B 6/4441* (2013.01); *G02B 6/445* (2013.01); *G02B 6/4444* (2013.01)

(58) Field of Classification Search
CPC .... G02B 6/4439; G02B 6/444; G02B 6/4441; G02B 6/4444–6/4446; G02B 6/445
(Continued)

(56) References Cited

U.S. PATENT DOCUMENTS

| 4,963,700 A | * | 10/1990 | Olsen | ..................... H02G 15/18 |
| | | | | 174/138 F |
| 5,892,872 A | | 4/1999 | Glover | |

(Continued)

FOREIGN PATENT DOCUMENTS

| EP | 0872938 A2 | 10/1998 | | |
| WO | WO 2014/005918 A2 * | 1/2014 | ............... | H02G 3/22 |

(Continued)

OTHER PUBLICATIONS

International Search Report and Written Opinion PCT/US2017/048805 dated Nov. 17, 2017.

*Primary Examiner* — Robert Tavlykaev
(74) *Attorney, Agent, or Firm* — Robert L. Branham (57) ABSTRACT

A telecommunications closure includes a base, a cover coupled to the base, and a first interior volume defined between the cover and the base. The cover includes a compartment having an opening and defining a second interior volume. The telecommunications closure also includes a flexible telecommunications line having a first end located within the first interior volume and a second end located outside of the first interior volume. The second end of the telecommunications line has a connector for coupling to other telecommunications lines. A portion of the flexible telecommunications line passes through the opening of the compartment. The telecommunications closure also includes at least one sealing member positioned in the second interior volume of the compartment to seal the flexible telecommunications line in the opening.

17 Claims, 6 Drawing Sheets

(58) Field of Classification Search
USPC .................. 385/134, 135; 361/601, 627
See application file for complete search history.

(56) References Cited

U.S. PATENT DOCUMENTS

| | | | |
|---|---|---|---|
| 6,314,229 B1* | 11/2001 | Sasaki | G02B 6/4444 385/135 |
| 6,621,975 B2 | 9/2003 | Laporte et al. | |
| 6,766,094 B2 | 7/2004 | Smith et al. | |
| 7,013,074 B2* | 3/2006 | Battey | G02B 6/445 385/135 |
| 7,805,044 B2 | 9/2010 | Reagan et al. | |
| 7,869,681 B2 | 1/2011 | Battey et al. | |
| 8,213,760 B2 | 7/2012 | Rudenick et al. | |
| 8,213,761 B2 | 7/2012 | Gronvall et al. | |
| 8,718,434 B2 | 5/2014 | Gronvall et al. | |
| 8,770,861 B2* | 7/2014 | Smith | G02B 6/36 385/135 |
| 9,310,578 B2 | 4/2016 | Vastmans et al. | |
| 2005/0271344 A1 | 12/2005 | Grubish et al. | |
| 2006/0204198 A1* | 9/2006 | Michiels | G02B 6/4446 385/135 |
| 2007/0253673 A1* | 11/2007 | Nielsen | A61N 1/3754 385/138 |
| 2010/0142909 A1* | 6/2010 | Mullaney | G02B 6/4447 385/135 |
| 2010/0284662 A1 | 11/2010 | Reagan et al. | |
| 2015/0137461 A1* | 5/2015 | Coenegracht | G02B 6/4444 277/618 |
| 2017/0299819 A1* | 10/2017 | Smith | G02B 6/3885 |

FOREIGN PATENT DOCUMENTS

| | | |
|---|---|---|
| WO | 2014139102 A1 | 9/2014 |
| WO | 2014201633 A1 | 12/2014 |

\* cited by examiner

FLEX PORT ENABLED TELECOMMUNICATIONS CLOSURE

CROSS-REFERENCE TO RELATED APPLICATIONS

This application claims the benefit of priority under 35 U.S.C. § 119 of U.S. Provisional Applications 62/381,968 filed on Aug. 31, 2016 and 62/398,773 filed on Sep. 23, 2016, the content of each is relied upon and incorporated herein by reference in their entireties.

BACKGROUND

Multiple System Operators (MSOs) and other telecommunications service providers have been under pressure to offer higher bandwidth services to customers. Preexisting telecommunications infrastructure may not be able to offer these higher bandwidth services. As such, MSOs and other telecommunications service providers may implement both legacy telecommunications network components and new fiber optic network components in parallel to achieve desired bandwidths. The use of both legacy telecommunications components and fiber optic network components in the same pedestals, pits, cabinets, closures or other telecommunications infrastructure may cause congestion in these spaces. In some cases, the current pedestals, pits, cabinets and closures are unable to accommodate both legacy telecommunications equipment and additional fiber optic network components due to the size and space requirements for these components.

SUMMARY

The present disclosure includes various embodiments of a fiber optic closure that provides a fiber optic network access point in a small, re-accessible form factor. In some embodiments, the closure includes connectivity that is external to the closure thereby allowing the closure to have a small form factor without connectors directly integrated into the base or cover of the closure. The connectivity for the closure may be provided by way of flex ports, or flexible telecommunications lines having a telecommunications connector at one end. The flexible telecommunications line of the flex port may have a first end located inside the closure and a second end having a hardened, outdoor connector that is positioned outside of the closure. This allows the closure itself to have a small form factor while still providing adequate and convenient connectivity. The small closure and flex ports are also more easily positioned in existing pedestals, pits, cabinets or closures that may already include legacy telecommunications components.

In some embodiments, a telecommunications closure includes a base, a cover coupled to the base, wherein the cover is movable relative to the base between an open position and a closed position. The cover and base define a first interior volume of the telecommunications closure when the cover is in the closed position. The cover also includes a compartment that defines a second interior volume, and the compartment includes an opening into the second interior volume from an exterior of the cover. The telecommunications closure also includes a flexible telecommunications line comprising a first end and a second end, wherein the second end comprises a connector and the flexible telecommunications line passes through the opening of the compartment and the second interior volume so that the first end is located within the first interior volume. The telecommunications closure also includes a first sealing member and a second sealing member that are configured to seal the opening when the first sealing member and the second sealing member are in a compressed state. The flexible telecommunications line passes between the first sealing member and the second sealing member and the first sealing member and the second sealing member are sized to fit within the second interior volume of the compartment when the first sealing member and the second sealing member are in the compressed state.

In another embodiment, the telecommunications closure includes a base, a cover coupled to the base, a first interior volume defined between the base and the cover when the cover is in the closed position, a main sealing member positioned between the base and the cover to seal a port in the base and to seal the first interior volume when the cover is in the closed position. The telecommunications closure also includes at least one supplemental sealing member. The supplemental sealing member is positioned in a compartment of the cover for sealing an opening in the cover when the supplemental sealing member is in a compressed state. The supplemental sealing members are sized to fit within the compartment when the supplemental sealing members are in the compressed state.

In yet another embodiment, a method of assembling a telecommunications closure is described. The method includes coupling a cover to a base, wherein the cover is movable relative to the base between an open position and a closed position and wherein the cover and the base defining a first interior volume when the base and the cover are in the closed position. The cover also includes a compartment that has a second interior volume and an opening. The method also includes placing a first sealing member in the compartment and placing a first end of a flexible telecommunications line through the opening and into the first interior volume. The method may also include placing the second end of the flexible telecommunications line outside of the first interior volume, wherein the second end of the flexible telecommunications line comprises a connector. In addition, the method may include placing a second sealing member in the compartment of the cover such that at least a portion of the flexible telecommunications line is located between the first sealing member and the second sealing member. The method may also include securing a compression member to the cover to compress the first sealing member and the second sealing member, wherein the first sealing member and the second sealing member are sized to fit within the second interior volume when the first sealing member and the second sealing member are in a compressed state. The method may also include securing the cover to the base.

In yet another embodiment, a telecommunications closure includes a base and a cover coupled to the base. The cover is movable relative to the base between an open position and a closed position and the cover and the base define a first interior volume of the telecommunications closure when the cover is in the closed position. The cover also includes a compartment defining a second interior volume of the telecommunications closure and the compartment includes an opening into the second interior volume from an exterior of the cover. The telecommunications closure also include a first sealing member and a second sealing member that are configured to seal the opening of the compartment when the first sealing member and the second sealing member are in a compressed state. In addition, the first sealing member and the second sealing member are sized to fit within the second interior volume when the first sealing member and the second sealing member are in the compressed state. The telecommunications closure also includes a flexible telecommunications line comprising a first end and a second end, wherein the second end comprises a connector, wherein the flexible telecommunications line passes through the opening of the compartment and between the first sealing member and second sealing member so that the first end is located within the first interior volume.

Additional features and advantages will be set forth in the detailed description which follows, and in part will be readily apparent to those skilled in the art. It is to be understood that the foregoing general description, the following detailed description, and the accompanying drawings are merely exemplary and intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiments, and together with the description serve to explain principles and operation of the various embodiments. Features and attributes associated with any of the embodiments shown or described may be applied to other embodiments shown, described, or appreciated based on this disclosure.

DETAILED DESCRIPTION

Various embodiments will be further clarified by examples in the description below. In general, the description relates a closure that provides a network access point in a small form factor while delivering splitting capability, splice capability, fiber management and connectivity. The closure is re-enterable to allow a technician to add or remove splitters or splices, or to add or replace connectivity elements. The small form factor of the closure may allow it to fit within existing pedestals, pits or other areas formerly used for copper communication technology or hybrid fiber coax (HFC) technology. In some cases, the small form factor allows a user to install the closure in a pedestal, pit or other location that also includes existing legacy telecommunications technology. The connectivity for the closure may be provided by way of one or more flex ports that pass through flex port openings in a raised compartment of the closure. As used herein, the term "flex port" means a flexible telecommunications line (for example, a telecommunications cable) having a connector at one or both ends. In use, a first end of each flex port is located in the closure while a second end of each flex port is positioned outside of the closure. The second end of each flex port includes a connector that is easily accessible to a technician. The positioning of the connectorized second end of each flex port outside of the closure allows the closure to have adequate connectivity while maintaining the small form factor of the closure.

Figure 1:
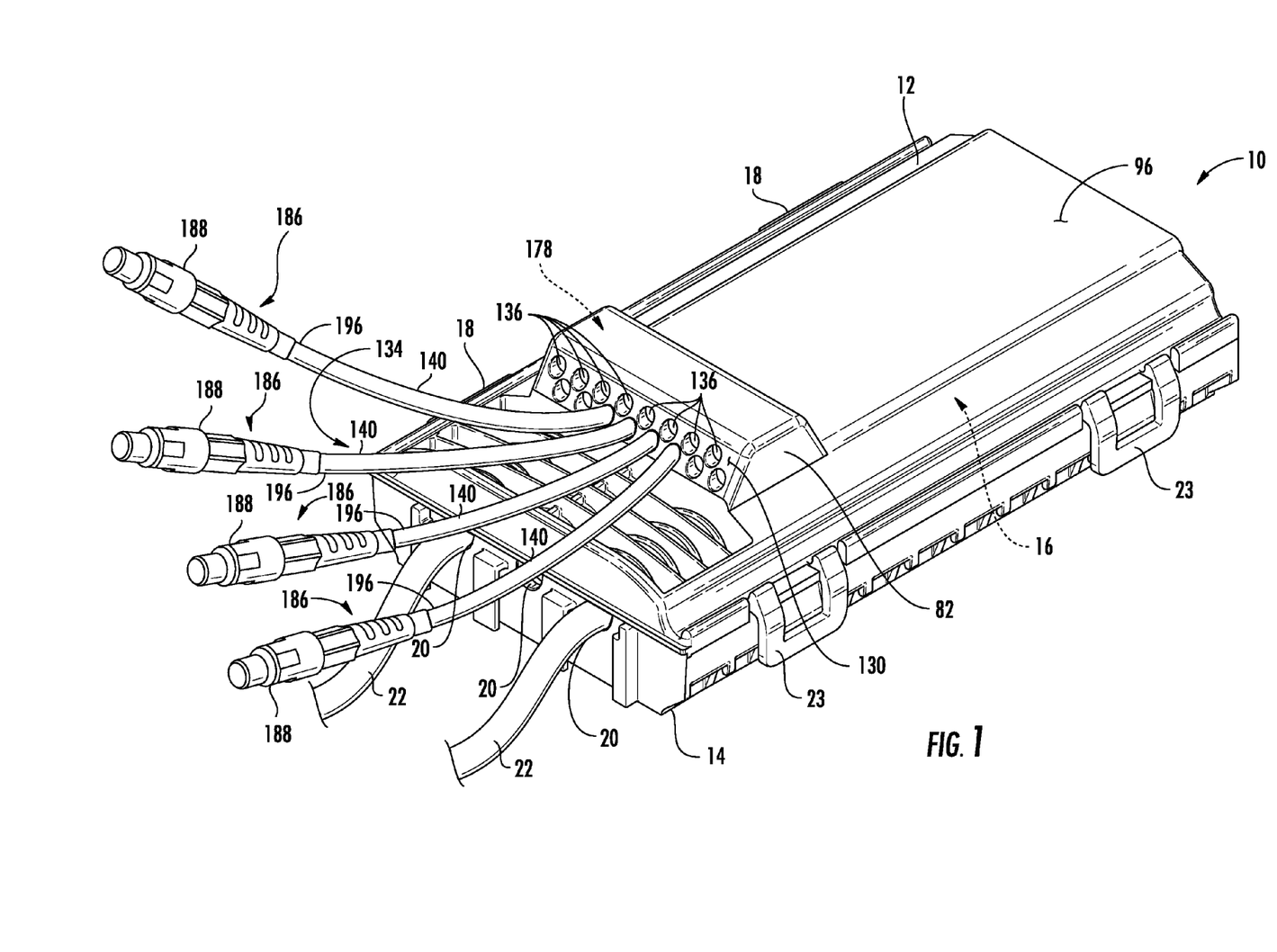
FIG. 1 is a perspective view of an embodiment of a telecommunications closure in accordance with this disclosure.
Figure 2:
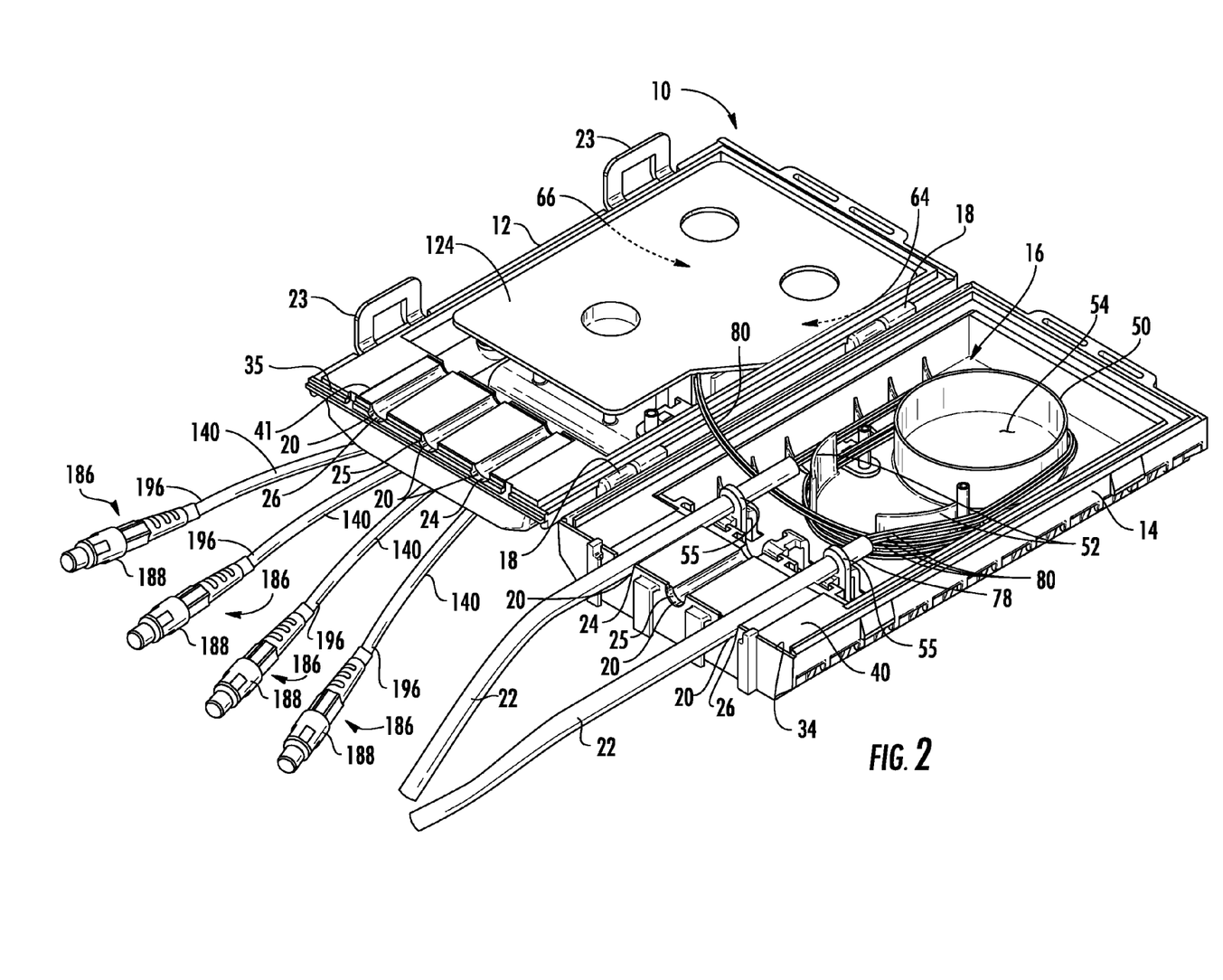
FIG. 2 is a perspective view of the telecommunications closure of FIG. 1 with the base and cover in an open position.

Referring now to FIGS. 1 and 2, the telecommunications closure 10 may include a base 14, a cover 12 coupled to the base 14, and an interior volume 16 defined between the cover 12 and the base 14 when the cover 12 is in a closed position (FIG. 1). The cover 12 is movable from the closed position (FIG. 1) to an open position (FIG. 2) with respect to the base 14. In some embodiments, for example, the base 14 may be hingedly coupled to the cover 12 by one or more hinges 18. The cover 12 may also include one or more locking mechanisms 23 to releasably secure the cover 12 to the base 14 when the cover 12 is in the closed position. The locking mechanisms 23 are releasable to allow the cover 12 to move from the closed position (FIG. 1) to the open position (FIG. 2) when a technician desires to access the interior volume 16 of the telecommunications closure 10. The base 14 and the cover 12 may be manufactured of any suitable material. In some embodiments, for example, the base 14 and the cover 12 are manufactured of a rigid plastic or metal material.

Referring now specifically to FIG. 2, the base 14 includes an edge 34 that faces an edge 35 of the cover 12 when the cover 12 is in the closed position. The edges 34 and 35 may include one or more cable ports 20 configured to receive a distribution cable 22. In some embodiments, the cable ports 20 are configured to allow at least one distribution cable 22 to enter and exit the interior volume 16 of the closure 10. For example, the distribution cable 22 may enter the interior volume 16 of the telecommunications closure 10 through a first cable port 24 (FIG. 2) and exit the interior volume 16 through a second cable port 26 (FIG. 2).

The cable ports 20 are sealed by the same seals that seal the cover 12 to the base 14. Referring to FIG. 2, for example, the base 14 includes a seal 40 that extends along the edge 34. The cover 12 also includes a seal 41 that is positioned adjacent to the cable ports 20. When the cover 12 is in the closed position, the sealing members 40, 41 compress against each other to seal the interior volume 16 and to seal the distribution cable 22 within the cable ports 20. The seals 40, 41 may be made of any suitable material, such as a gel or gasket material.

The base 14 may also include one or more cable slack storage features, such as a cylindrical protrusion 50 and semi-circular protrusions 52. The cylindrical protrusion 50 and the semi-circular protrusions 52 may be integrated with an interior surface 54 of the base 14 to reduce the need for additional parts and to reduce the overall size of the telecommunications closure 10. In use, the distribution cable 22 enters the telecommunications closure 10 through the first cable port 24, routes around one or both of the cylindrical protrusion 50 and the semi-circular protrusion 52, and then exits the telecommunications closure 10 through the second cable port 26. The jacket 78 of the distribution cable 22 may be removed inside the telecommunications closure 10 to expose individual optical fibers 80. The individual optical fibers 80 may be routed from the slack storage features of the base 14 (e.g., the cylindrical protrusion 50 or the semi-circular protrusions 52) to fiber management features 166, 168, 170 (FIG. 3) of the cover 12, as described in more detail below.

In some embodiments, the telecommunications closure 10 also includes a third cable port 25 (FIG. 2) that may be used to feed an additional distribution cable (not shown) into the telecommunications closure 10. The third cable port 25 is sealable in a similar manner to the first and second cable ports 24 and 26, as described above. The cable from the third cable port 25 may be stored on the cable slack storage features (e.g., the cylindrical protrusion 50 or the semi-circular protrusions 52) of the base 14, as described above in connection with the distribution cable 22.

The base 14 may also include strain relief features 55 for holding the distribution cable 22 in place within the telecommunications closure 10.

Figure 3:
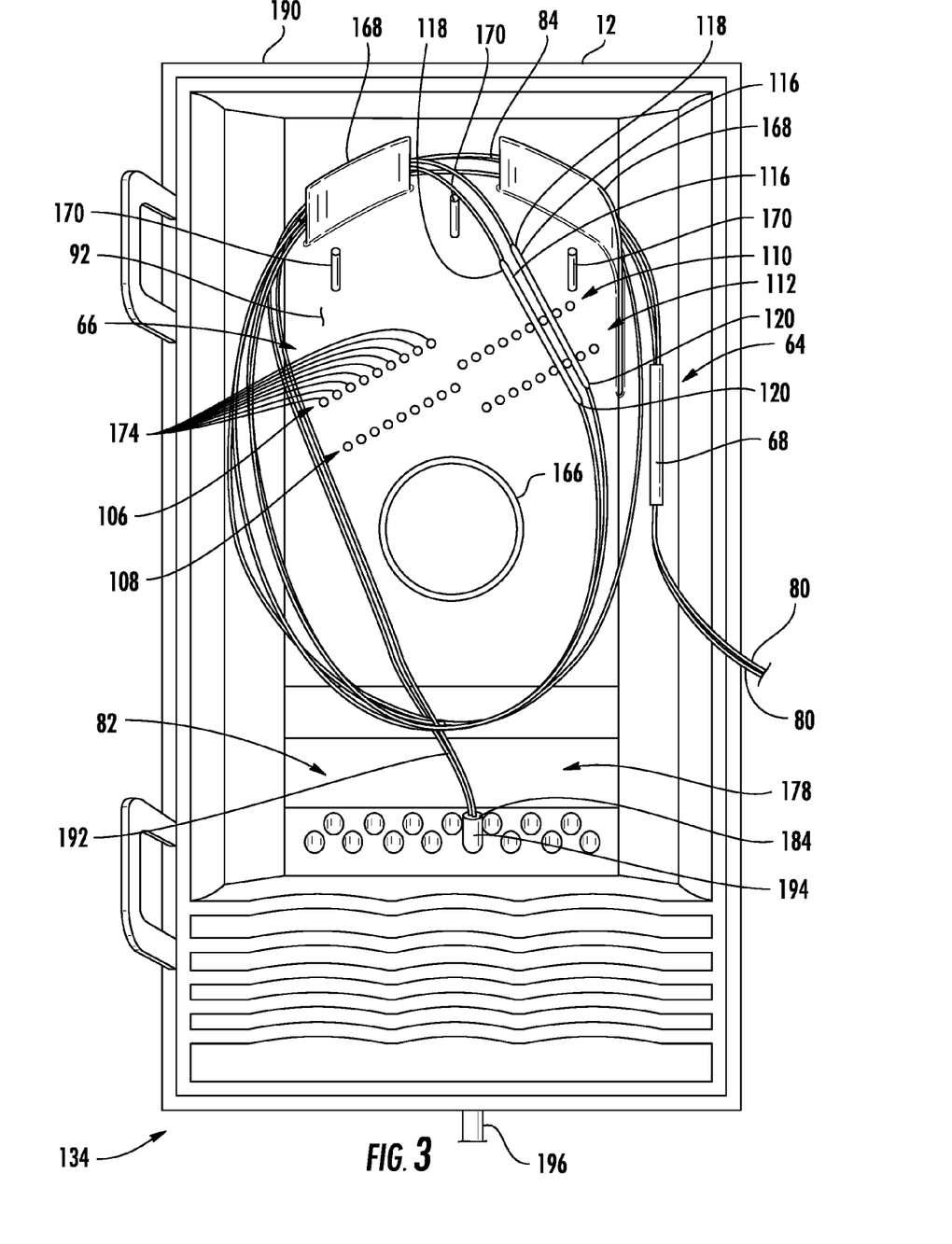
FIG. 3 is a perspective view of the base of the telecommunications closure of FIG. 1.

FIG. 3 illustrated a close up, perspective view of the cover 12 of the telecommunications closure 10 of FIG. 1. The cover 12 may include a splitter area 64, a splice area 66, fiber routing features 166, 168, 170, and a raised compartment 82 (see also FIG. 1). The splitter area 64 may include one or more splitters 68 for splitting a signal from the optical fibers 80 of the distribution cable 22. In use, one or more fibers 80 from the distribution cable 22 are fed from the base 14 to the splitter area 64 of the cover 12. One or more of the splitters 68 split the signal from the optical fibers 80 into multiple signals for transmission on multiple distribution fibers 84.

The distribution fibers 84 from the splitter 68 are routed by fiber routing features 166, 168, 170 from the splitter area 64 to the splice area 66. The fiber routing features 166, 168, 170 may be integrated with the interior surface 92 of the cover 12 to save space in the telecommunications closure 10 and to reduce the number of extra parts included in the telecommunications closure 10. In the embodiment illustrated in FIG. 3, the fiber routing features include a cylindrical protrusion 166, a plurality of semi-circular protrusions 168, and a plurality of posts 170 that extend from the interior surface 92 of the cover 12. The routing features 166, 168, 170 are oriented such that the distribution fibers 84 are routed in the telecommunications closure 10 around the splice area 66. The fibers 84 are routed by the routing features 166, 168, 170 to maintain an acceptable bend radius in the distribution fibers 84 as they are routed from the splitter 68 to the splice area 66.

The splice area 66 is circumscribed by at least some of the fiber routing features, such as the semi-circular protrusions 168 and the posts 170, so that the distribution fibers 84 are routed around and then into the splice area 66. The splice area 66 includes a plurality of splice holding protrusions 174 that are integral with an interior surface 92 of the cover 12. Reference number 174 indicates a plurality of example splice holding protrusions 174 while the additional splice holding protrusion are not labeled with reference number 174 to preserve the clarity of FIG. 3.

The splice area 66 illustrated in FIG. 3 includes four rows 106, 108, 110 and 112 of splice holding protrusions 174 that extend from the interior surface 92 of the cover 12. While the embodiment of FIG. 3 includes four rows 106, 108, 110 and 112 of splice holding protrusions 174, the cover 12 may include any number of protrusions 174 in any suitable orientation. In the embodiment illustrated in FIG. 3, a first row 106 of protrusions 174 is offset from and parallel to a second row 108 of protrusions 174. Likewise, a third row 110 of protrusions 174 is offset from and parallel to a fourth row 112 of protrusions 174. The first row 106 has the same number of protrusions 174 as the second row 108 and the third row 110 has the same number of protrusions 174 as the fourth row 112. Thus, the first and second rows 106 and 108 of protrusions 174 provide a holding area for a first set of splices 116 while the third and fourth rows 110 and 112 provide a holding area for a second set of splices 116. In the embodiment illustrated in FIG. 3, an upper portion 118 of each splice 116 is placed between adjacent protrusions 174 of the third row 110 of protrusions 174 and a lower portion 120 of the splice 116 is placed between adjacent protrusions 174 of the fourth row 112 of protrusions 174. A friction fit holds the splices 116 between the protrusions 174 to prevent accidental movement of the splices 116 once in place. Additional splices 116 can be placed between other protrusions 174 in a similar manner until there is a splice 116 between each pair of adjacent protrusions 174. Thus, while two splices 116 are illustrated in FIG. 3, the splice area 66 may include any suitable number of splices 116.

In the embodiment of FIG. 3, the first, second, third and fourth rows 106, 108, 110 and 112 of protrusions 174 are oriented at an angle compared with an upper edge 190 of the cover 12. The angled orientation of the first, second, third and fourth rows 106, 108, 110, 112 of protrusions 174 may allow for the distribution fibers 84 and flex port fibers 192 to more easily align with the splices 116 without exceeding an acceptable bend radius for the distribution fibers 84 or the flex port fibers 192.

Referring again to FIG. 2, the cover 12 may also include a protective shield 124 for protecting the splice area 66 and the splitter area 64. The protective shield 124 is removable to allow access to the splice area 66 and the splitter area 64 as needed.

Figure 4:
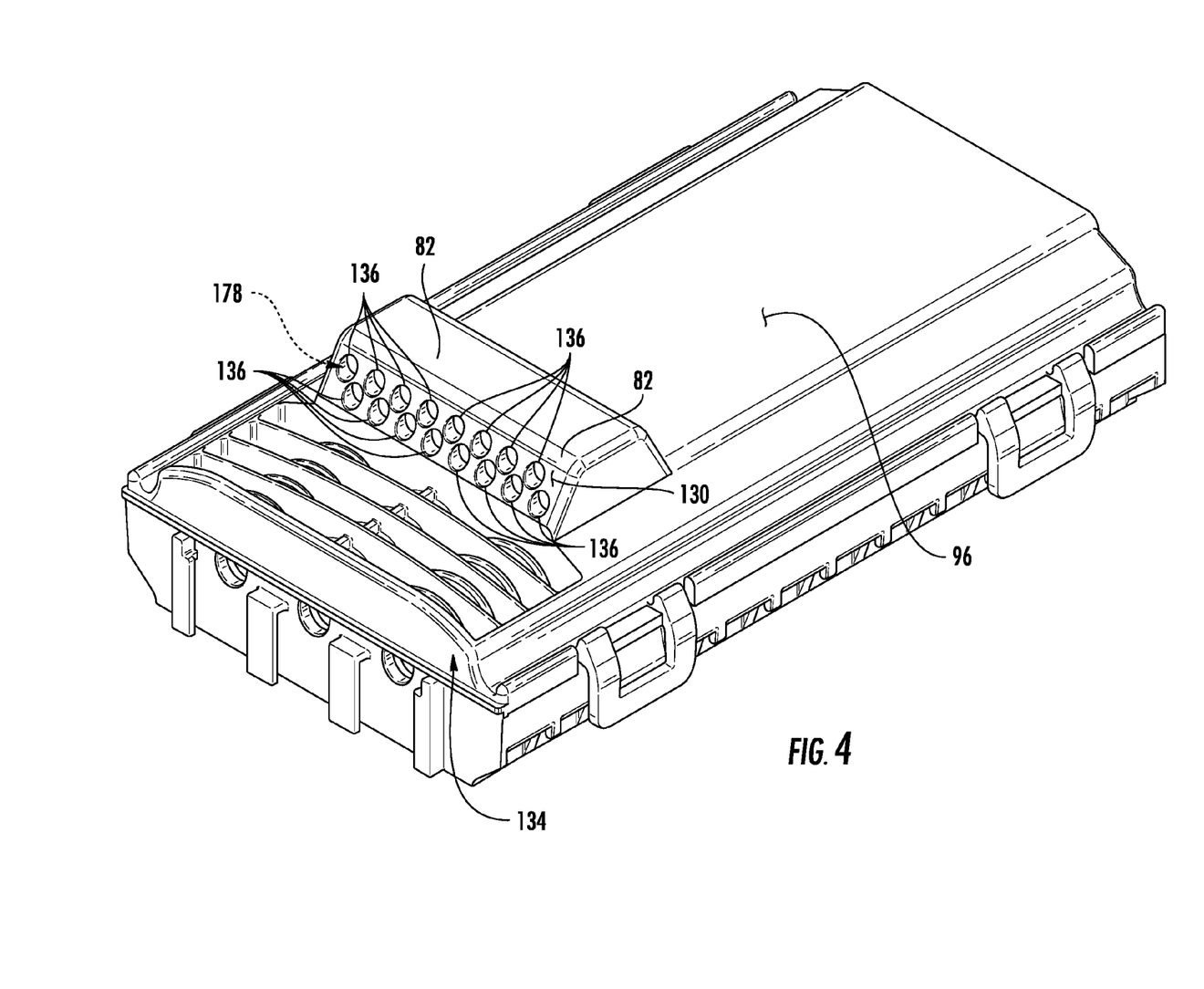
FIG. 4 is a perspective view of the telecommunications closure of FIG. 1 with the flex ports removed.

Referring now to FIGS. 1, 3 and 4, the raised compartment 82 protrudes from a main surface 96 (FIGS. 1 and 4; also called an exterior surface) of the cover 12. The raised compartment 82 may be located near a first end 134 of the cover 12 so that the raised compartment 82 does not overlap the fiber management features 166, 168, 170 of the cover 12 (FIG. 3). In addition, the raised compartment 82 is located near the cable ports 20 (see e.g., FIG. 1) when the base 14 and the cover 12 are in the closed position. The location of the raised compartment 82 near the cable ports 20 and adjacent to the fiber management features 166, 168, 170 of the cover 12 allows for organized fiber and cable routing within the telecommunications closure 10.

Referring now specifically to FIGS. 1 and 4, a front surface 130 of the raised compartment 82 includes at least one flex port opening 136. The flex port openings 136 may be organized in one or more rows on the front surface 130 of the raised compartment 82. The flex port openings 136 provide access to the interior volume 16 for flex ports 140, as will be discussed in more detail below.

Referring again to FIGS. 1, 3 and 4, the raised compartment 82 includes a second interior volume 178 that is open to the first interior volume 16 (FIG. 2). The second interior volume 178 of the raised compartment 82 provides space for one or more sealing features to seal flex ports 140 within the flex port openings 136 without obstructing the fiber routing, splitting and splicing in the telecommunications closure 10.

Figure 5:
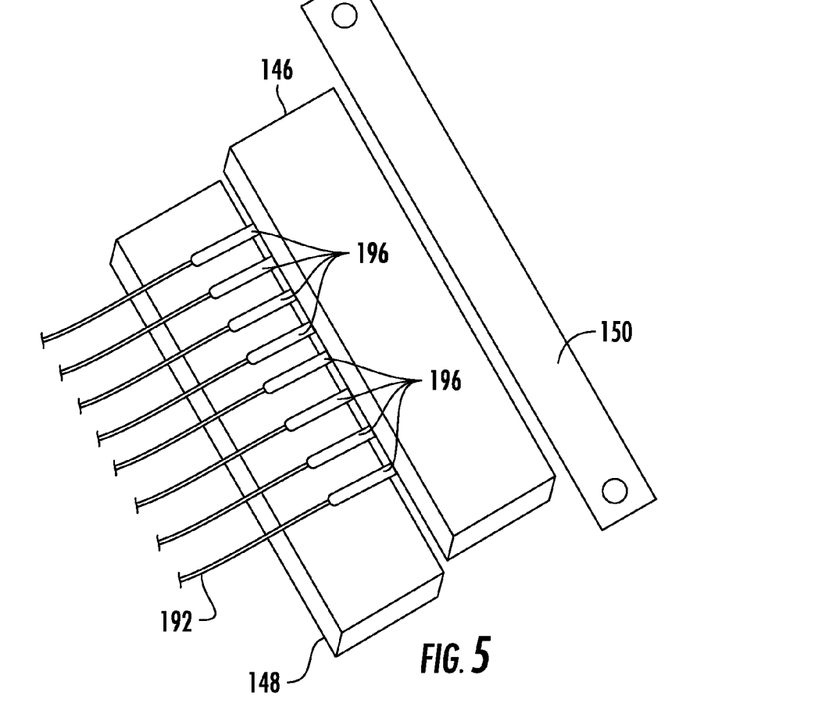
FIG. 5 is a schematic view of a seal for use in the compartment of the cover of a telecommunications closure in accordance with this disclosure.

FIG. 5 illustrates a sealing assembly for the flex port openings 136 of the raised compartment 82. In some embodiments, the sealing assembly includes an upper sealing member 146 (also called a first supplemental sealing member), a lower sealing member 148 (also called a second supplemental sealing member) and a compression member 150 for compressing the upper sealing member 146 against the lower sealing member 148 to seal the flex ports 140 within the flex port openings 136 (see FIGS. 4 and 6B). The upper sealing member 146, the lower sealing member 148 and the compression member 150 may also seal unused flex port openings 136. In the embodiment illustrated in FIG. 5, the compression member 150 is a plate that can be secured to the cover 12 and to compress the upper and lower sealing members 146, 148.

Each flex port 140 comprises a flexible telecommunications line 196 having a connector 188 (see FIG. 2) on at least one end of the flexible telecommunications line 196. In use, the flexible telecommunications line 196 of each flex port 140 passes between the upper sealing member 146 and the lower sealing member 148 after passing through the flex port openings 136. The compression member 150 is configured to compress the upper sealing member 146 and the lower sealing member 148 around flexible telecommunications line 196 of each flex port 140 thereby sealing the flex ports 140 within the flex port openings 136. The compression member 150 may be couplable to the cover 12 to compress the upper sealing member 146 and the lower sealing member 148 within the raised compartment 82, thus sealing the flex ports 140 within the flex port openings 136 and sealing any unused flex port openings 136.

The compression member 150 compresses the upper and lower sealing members 146, 148 in the second internal volume 178 of the raised compartment 82 so that the upper and lower sealing members 146, 148 do not obstruct the splitting, splicing, cable routing and fiber routing in the telecommunications closure 10. In addition, the material of the upper and lower sealing members 146 and 148 may expand to fill vacant flex port openings 136. For example, in some embodiments the upper and lower sealing members 146 and 148 are made of a gel material that expands to fill vacant flex port openings 136.

In another embodiment, the raised compartment 82 may include an upper sealing member 146, a lower sealing member 148 and an intermediate sealing member (not illustrated) positioned between the upper sealing member 146 and the lower sealing member 148. The intermediate sealing member may be similar to the upper sealing member 146 or the lower sealing member 148 illustrated in FIG. 5. In use, a first row of flex ports 140 can be positioned between the upper sealing member 146 and the intermediate sealing member while a second row of flex ports 140 (see FIGS. 1 and 2) can be positioned between the intermediate sealing member and the lower sealing member 148.

Figure 6A:
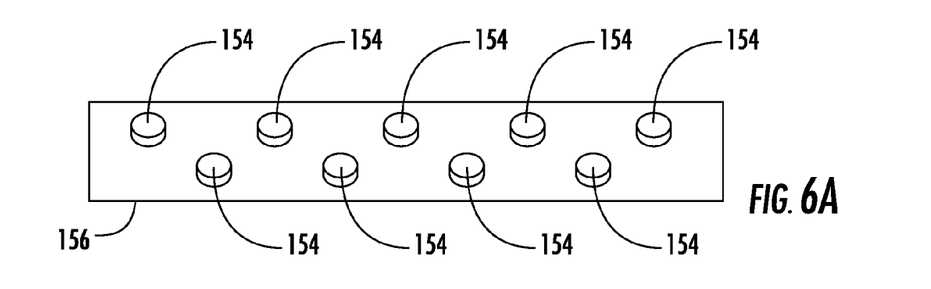
FIG. 6A is a schematic view of another sealing element for use in the compartment of the cover of a telecommunications closure in accordance with this disclosure.
Figure 6B:
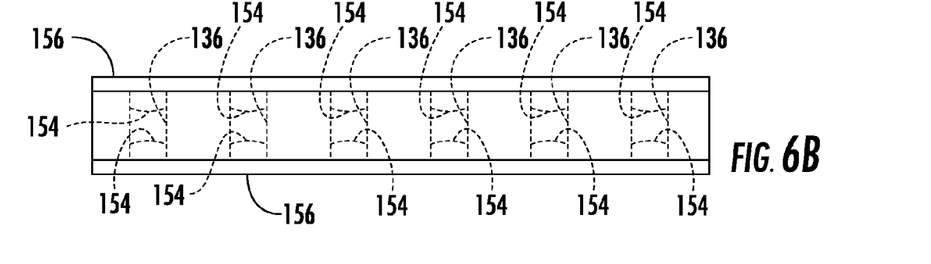
FIG. 6B is a schematic view of two of the sealing elements of FIG. 6A.

Referring now to FIGS. 6A and 6B, in yet another embodiment the flex port openings 136 may be sealed by one or more plugs 154. The plugs 154 may be placed within the unused flex port openings 136 to seal the flex port openings 136 until they are needed. A plurality of plugs 154 may be coupled to a base 156 for placement in a corresponding number of flex port openings 136. The base 156 may include a plug 154 corresponding to each of the flex port openings 136 in the raised compartment 82. When a flex port opening 136 is to be used, the corresponding plug 154 is removed from the flex port opening 136 and from the base 156, for example, by cutting the plug 154 from the base 156. The remaining plugs 154 may then be replaced in the un-used flex port openings 136.

Referring specifically to FIGS. 1 and 3, one or more of the flex port openings 136 of the telecommunications closure 10 may include a flex port 140 therein. As discussed above, each flex port 140 includes a flexible telecommunications line 196 and a connector 188. The flexible telecommunications line 196 may include one or more optical fibers 192 protected by a jacket 194. The connector 188 may be any suitable indoor or outdoor connector. For example, the connector 188 may be an OptiTip® or OptiTap® connector manufactured by Corning Optical Communications, LLC of Hickory, N.C. In some embodiments, the diameter of the flex port openings 136 is smaller than the largest outer diameter of the connector 188. As such, the flex port openings 136 take up less space on the telecommunications closure 10 than would be the case if the connectors 188 were integrated directly into the cover 12.

Each flexible telecommunications line 196 has a first end 184 located inside the interior volume 16 of the telecommunications closure 10 and a second end 186 (see FIGS. 1 and 2) located outside the interior volume 16. The second end 186 of the flexible telecommunications line 196 includes the connector 188 so that the connector 188 is easily accessible to a user. Although only one flex port 140 is illustrated in FIG. 3 and four flex ports 140 are illustrated in FIG. 1, the telecommunications closure 10 may include any suitable number of flex port openings 136 and flex ports 140.

To install a flex port 140 in a flex port opening 136, the first end 184 of the flexible telecommunications line 196 is routed through the flex port opening 136, through the interior volume 178 and into the interior volume 16. A portion of the jacket 194 of the flex port 140 is removed and the flex port fibers 192 are routed through the fiber management features 166, 168, 170 of the cover 12 (FIG. 3) to the splice area 66. Referring to FIGS. 1 and 2, the second end 186 of each flexible telecommunications line 196 remains outside of the telecommunications closure 10 to provide easy access to the connectors 188 and to reduce the overall size of the closure 10 compared with a closure that includes connectors integrated into the cover of the closure.

Figure 7:
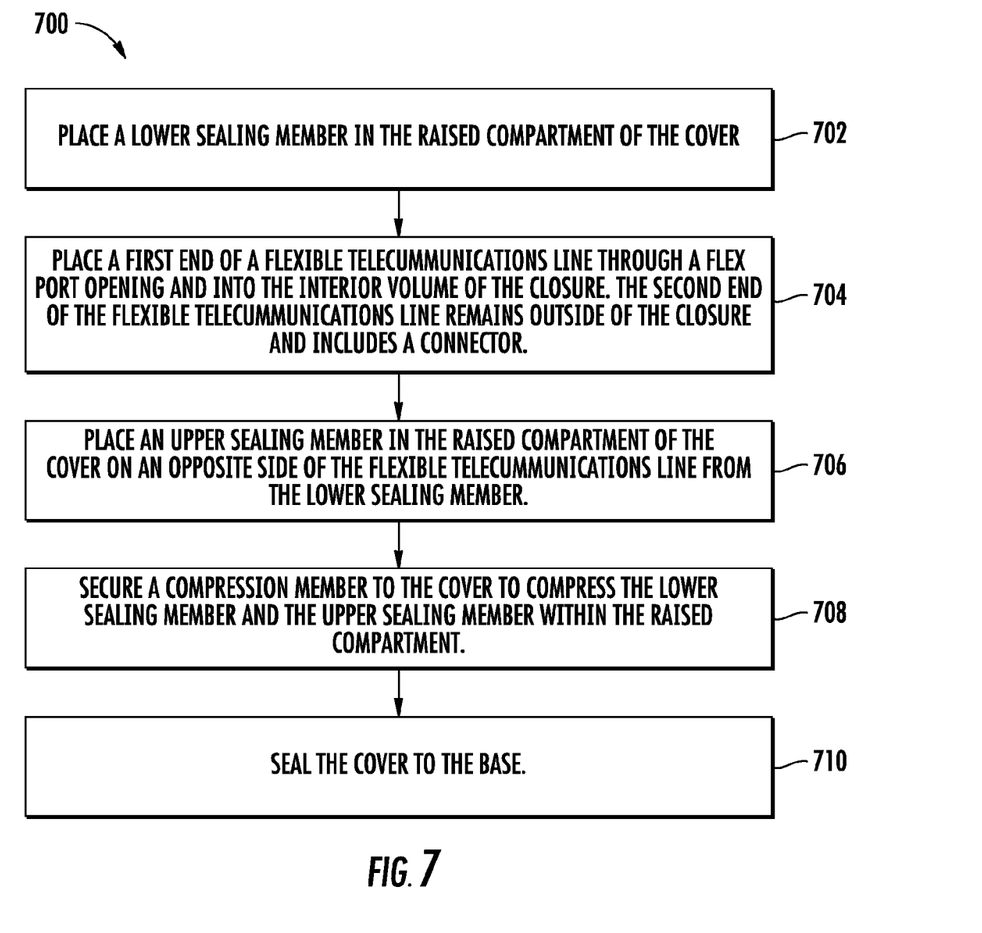
FIG. 7 is a process diagram illustrating an embodiment of a method of sealing a flex port in a telecommunications closure.

FIG. 7 is a flow chart 700 of a method of sealing one of the flex ports 140 within the telecommunications closure 10. According to the method, the lower sealing member 148 is placed in the raised compartment 82 of the cover 12, as illustrated at block 702. A first end 184 of a flexible telecommunications line 196 of a flex port 140 is placed through a flex port opening 136 and into the interior volume 16 of the closure 10, as illustrated at block 704. The second end 186 of the flexible telecommunications line 196 of the flex port 140 remains outside of the closure 10 and includes a connector 188.

The upper sealing member 146 is then placed in the raised compartment 82 of the cover 12 on an opposite side of the flexible telecommunications line 196 from the lower sealing member 148, as illustrated at block 706. The compression member 150 is then secured to the cover 12 to compress the lower sealing member 148 and the upper sealing member 146 within the raised compartment 82, as illustrated at block 708. The flex port 140 may then be spliced to one or more distribution fibers 84 from a distribution cable 22. The cover 12 may then be sealed to base 14, as illustrated at block 710.

To add or remove one or more flex ports 140 from the closure 10, the cover 12 is placed in the open position. The compression member 150 is released from the cover 12 and the upper sealing member 146 is removed. The existing flex ports 140 can then be removed from the flex port openings 136 or additional flex ports 140 can be added to the flex port openings 136, as described above.

Persons skilled in optical communications will appreciate additional variations and modifications of the devices and methods already described. Additionally, where a method claim below does not explicitly recite a step mentioned in the description above, it should not be assumed that the step is required by the claim. Furthermore, where a method claim below does not actually recite an order to be followed by its steps or an order is otherwise not required based on the claim language, it is not intended that any particular order be inferred.

The above examples are in no way intended to limit the scope of the present invention. It will be understood by those skilled in the art that while the present disclosure has been discussed above with reference to examples of embodiments, various additions, modifications and changes can be made thereto without departing from the spirit and scope of the invention as set forth in the claims.

The invention claimed is:

1. A telecommunications closure, comprising:
   a base;
   a cover coupled to the base, wherein the cover is movable relative to the base between an open position and a closed position, the cover and base define a first interior volume of the telecommunications closure when the cover is in the closed position and also define at least one cable port at an intersection of the base and the cover, the cover includes a compartment on a main exterior surface of the cover that defines a second interior volume, wherein the compartment does not contact the base and the compartment includes an opening into the second interior volume from an exterior of the cover;
   a flexible telecommunications line comprising a first end and a second end, wherein the second end comprises a connector, wherein the flexible telecommunications line passes through the opening of the compartment and the second interior volume so that the first end is located within the first interior volume;
   a first sealing member and a second sealing member that are configured to seal the opening when the first sealing member and the second sealing member are in a compressed state, wherein the flexible telecommunications line passes between the first sealing member and the second sealing member, and wherein the first sealing member and the second sealing member are sized to fit within the second interior volume of the compartment when the first sealing member and the second sealing member are in the compressed state; and
   a compression member for compressing the first sealing member and the second sealing member in the second interior volume of the compartment, wherein the compression member comprises a plate that is removably couplable to the cover.

2. The telecommunications closure of claim 1, wherein the first sealing member and the second sealing member are removable from the compartment.

3. The telecommunications closure of claim 1, wherein the second interior volume is open to the first interior volume.

4. The telecommunications closure of claim 1, wherein an exterior surface of the compartment protrudes from an exterior surface of the cover.

5. The telecommunications closure of claim 1, wherein the compartment comprises a plurality of the openings.

6. The telecommunications closure of claim 5, further comprising a plurality of the flexible telecommunications lines, wherein each of the flexible telecommunications lines passes through one of the plurality of openings such that the first end of each flexible telecommunications line is located inside the first interior volume.

7. The telecommunications closure of claim 1, where the flexible telecommunications line comprises at least one optical fiber.

8. A telecommunications closure, comprising:
   a base;
   a cover coupled to the base, wherein the cover is movable relative to the base between an open position and a closed position, wherein the base and cover define a first interior volume of the telecommunications closure when the cover is in the closed position and also define at least one cable port at an intersection of the base and the cover, wherein the cover comprises a compartment on a main exterior surface of the cover and wherein the compartment does not contact the base and the compartment comprises an opening;
   a main sealing member positioned between the base and the cover to seal the at least one cable port and the first interior volume when the cover is in the closed position;
   at least one supplemental sealing member positioned in the raised compartment for sealing the opening when the supplemental sealing member is in a compressed state, wherein the at least one supplemental sealing member comprises a first supplemental sealing member and a second supplemental sealing member and is sized to fit within the compartment when the at least one supplemental sealing member is in the compressed state, and
   a compression member for compressing the first supplemental sealing member and the second supplemental sealing member, wherein the compression member comprises a plate that is removably coupleable to the cover.

9. The telecommunications closure of claim 8, wherein the compartment comprises a second interior volume, wherein the second interior volume is open to the first interior volume.

10. The telecommunications closure of claim 8, further comprising a flexible telecommunications line comprising a first end and a second end, wherein the second end comprises a connector, wherein the first end of the flexible telecommunications line is located within the first interior volume.

11. The telecommunications closure of claim 8, further comprising a plug configured to seal the opening.

12. The telecommunications closure of claim 8, wherein the compartment comprises a plurality of the openings arranged in a plurality of rows on the compartment.

13. The telecommunications closure of claim 8, wherein the cover comprises a splice area.

14. The telecommunications closure of claim 13, wherein the cover further comprises a splitter area.

15. The telecommunications closure of claim 14, wherein the splice area and the splitter area are located on an interior surface of the cover.

16. A method of assembling a telecommunications closure, comprising:
   coupling a cover to a base, wherein the cover is movable relative to the base between an open position and a closed position, wherein the cover and the base define a first interior volume when the base and the cover are in the closed position and also define at least one cable port at an intersection of the base and cover, wherein the cover comprises a compartment on a main exterior surface of the cover, and wherein the compartment does not contact the base and comprises a second interior volume and an opening;

placing a first sealing member in the compartment;
placing a first end of a flexible telecommunications line through the opening and into the first interior volume;
placing the second end of the flexible telecommunications line outside of the first interior volume, wherein the second end of the flexible telecommunications line comprises a connector;
placing a second sealing member in the compartment of the cover such that at least a portion of the flexible telecommunications line is located between the first sealing member and the second sealing member;
securing a compression member to the cover to compress the first sealing member and the second sealing member, wherein the first sealing member and the second sealing member are sized to fit within the second interior volume when the first sealing member and the second sealing member are in a compressed state, and wherein the compression member comprises a plate that is removably couplable to the cover; and
securing the cover to the base.

17. A telecommunications closure, comprising:
a base;
a cover coupled to the base, wherein:
   the cover is movable relative to the base between an open position and a closed position;
   the cover and the base define a first interior volume of the telecommunications closure when the cover is in the closed position and also define at least one cable port at an intersection of the base and the cover;
   the cover includes a compartment defining a second interior volume of the telecommunications closure;
   the compartment does not contact the base and includes an opening into the second interior volume from an exterior of the cover;
a first sealing member and a second sealing member that are configured to seal the opening of the compartment when the first sealing member and the second sealing member are in a compressed state, wherein the first sealing member and the second sealing member are sized to fit within the second interior volume when the first sealing member and the second sealing member are in the compressed state;
a flexible telecommunications line comprising a first end and a second end, wherein the second end comprises a connector, wherein the flexible telecommunications line passes through the opening of the compartment and between the first sealing member and second sealing member so that the first end is located within the first interior volume; and
a compression member for compressing the first sealing member and the second sealing member in the second interior volume of the compartment, wherein the compression member comprises a plate that is removably couplable to the cover.

* * * * *

UNITED STATES PATENT AND TRADEMARK OFFICE
CERTIFICATE OF CORRECTION

PATENT NO. : 10,007,080 B2  
APPLICATION NO. : 15/337086  
DATED : June 26, 2018  
INVENTOR(S) : Alan Duncan Burkett et al.

Page 1 of 1

It is certified that error appears in the above-identified patent and that said Letters Patent is hereby corrected as shown below:

On the Title Page

In Column 1, Item (71), Applicant, Lines 1-2, delete "Corning Optical Communications LLC, Hickory, NC (US)" and insert -- Corning Research & Development Corporation, Corning, NY (US) --, therefor.

Signed and Sealed this  
Fifth Day of November, 2024

Katherine Kelly Vidal  
*Director of the United States Patent and Trademark Office*